(12) United States Patent
Street

(10) Patent No.: US 11,126,711 B2
(45) Date of Patent: Sep. 21, 2021

(54) SYSTEM AND METHOD FOR IMPLEMENTING A LOG SOURCE VALUE TOOL FOR SECURITY INFORMATION EVENT MANAGEMENT

(71) Applicant: JPMORGAN CHASE BANK, N.A., New York, NY (US)

(72) Inventor: Nate Street, Jersey City, NJ (US)

(73) Assignee: JPMorgan Chase Bank, N.A., New York, NY (US)

( * ) Notice: Subject to any disclaimer, the term of this patent is extended or adjusted under 35 U.S.C. 154(b) by 161 days.

(21) Appl. No.: 16/379,108

(22) Filed: Apr. 9, 2019

(65) Prior Publication Data

US 2020/0327221 A1    Oct. 15, 2020

(51) Int. Cl.
*G06F 21/55* (2013.01)
*H04L 29/06* (2006.01)
*G06F 21/57* (2013.01)

(52) U.S. Cl.
CPC .......... *G06F 21/552* (2013.01); *G06F 21/577* (2013.01); *H04L 63/1425* (2013.01); *H04L 63/1433* (2013.01); *H04L 63/20* (2013.01)

(58) Field of Classification Search
CPC . G06F 21/552; G06F 21/577; H04L 63/1425; H04L 63/20; H04L 63/1433
See application file for complete search history.

(56) References Cited

U.S. PATENT DOCUMENTS

| | | | | |
|---|---|---|---|---|
| 9,596,256 | B1 * | 3/2017 | Thomson | H04L 63/1441 |
| 10,735,442 | B1 * | 8/2020 | Swackhamer | G06F 3/0483 |
| 10,873,596 | B1 * | 12/2020 | Bourget | H04L 63/1441 |
| 10,902,114 | B1 * | 1/2021 | Trost | G06F 16/26 |
| 2008/0177687 | A1 * | 7/2008 | Friedlander | G06N 7/08 |
| | | | | 706/46 |

(Continued)

FOREIGN PATENT DOCUMENTS

CN        106790025 A    *  5/2017    ........... H04L 63/145

OTHER PUBLICATIONS

Gabriel, Roland et al., "Analyzing Malware Log Data to Support Security Information and Event Management: Some Research Results", 2009 First International Conference on Advances in Databases, Knowledge, and Data Applications , pp. 108-113. (Year: 2009).*

(Continued)

*Primary Examiner* — Michael Pyzocha
(74) *Attorney, Agent, or Firm* — Hunton Andrews Kurth LLP

(57) ABSTRACT

An embodiment of the present invention is directed to quantifying the value of an individual log source sent to the SIEM. Through vendor-agnostic measurement, an algorithmic model utilized by a Log Quality Value (LQV) index enables security engineers and incident response (IR) teams to determine which logs provide the most value for security investigations. An embodiment of the present invention recognizes a positive correlation between the LQV index and critical logs used to investigate the attack. An embodiment of the present invention may be extended to evaluate the LQV algorithms against a more extensive dataset from live production environments and to further measure the tool effectiveness through periodically comparing the LQV index to logs used to detect security incidents.

20 Claims, 5 Drawing Sheets

(56) References Cited

U.S. PATENT DOCUMENTS

| | | | |
|---|---|---|---|
| 2012/0246303 A1* | 9/2012 | Petersen | G06F 16/1734 |
| | | | 709/224 |
| 2013/0152158 A1* | 6/2013 | Yoshihama | G06F 21/6245 |
| | | | 726/1 |
| 2014/0007238 A1* | 1/2014 | Magee | H04L 63/1408 |
| | | | 726/24 |
| 2015/0193524 A1* | 7/2015 | Williams | G06F 21/552 |
| | | | 707/740 |
| 2016/0021139 A1* | 1/2016 | Stephan | G06F 21/552 |
| | | | 726/1 |
| 2017/0031741 A1* | 2/2017 | Seigel | H04L 41/069 |
| 2017/0177711 A1* | 6/2017 | Thomas | G06N 5/02 |
| 2018/0077175 A1* | 3/2018 | DiValentin | G06F 16/254 |
| 2018/0091542 A1* | 3/2018 | Bachner | H04L 63/20 |
| 2018/0113898 A1* | 4/2018 | Hall | G06F 16/215 |
| 2018/0124091 A1* | 5/2018 | Sweeney | G06F 16/2228 |
| 2018/0227324 A1* | 8/2018 | Chambers | H04L 63/1441 |
| 2018/0267973 A1* | 9/2018 | Zhang | G06F 16/24578 |
| 2018/0270263 A1* | 9/2018 | Zhang | G06N 5/047 |
| 2019/0020686 A1* | 1/2019 | Cohen | H04L 63/20 |
| 2019/0207966 A1* | 7/2019 | Vashisht | H04L 63/1416 |
| 2020/0252421 A1* | 8/2020 | Pendergast | H04L 63/1425 |
| 2020/0322361 A1* | 10/2020 | Ravindra | G06F 16/2477 |
| 2020/0327221 A1* | 10/2020 | Street | H04L 63/1425 |

OTHER PUBLICATIONS

Li, Zhou et al., "Operational security log analytics for enterprise breach detection", 2016 IEEE Cybersecurity Development, pp. 15-22. (Year: 2016).*

* cited by examiner

SYSTEM AND METHOD FOR IMPLEMENTING A LOG SOURCE VALUE TOOL FOR SECURITY INFORMATION EVENT MANAGEMENT

FIELD OF THE INVENTION

The invention relates generally to a system and method for implementing a log source value evaluation tool for security information event management.

BACKGROUND OF THE INVENTION

Security Information and Event Management (SIEM) products and services generally provide real-time analytics of security alerts generated by applications and network hardware. SIEM gives enterprise security professionals insight into activities within their IT environment. SIEM technology may include analyzing log and event data in real time to provide threat monitoring, event correlation and incident responses. SIEM technology may further involve collecting, analyzing and reporting on log data. This may be used to log security data and generate reports for compliance purposes.

Once an organization purchases the SIEM product, security engineers are tasked with deploying technology that may be utilized primarily by a separate Incident Response (IR) team to investigate potential security events and/or threats that occur on an organization's network. However, security engineers generally lack the Incident Response background required to fully understand the different types of log data that will be useful for the team during a potential security incident investigation.

In addition to regulatory pressures, organizations face internal challenges in the management of SIEM technology, which rely upon a growing number of diverse log sources generated by endpoints, network devices, cloud environments, and ultimately any organizational device that can potentially be compromised and utilized in an attack or fraudulent activity. Threat actors are continually inventing new attack variations while organizations are forced to aggressively adapt and implement countermeasures.

At present, it is challenging to determine whether a log source generated from an application/software, network device, security tool, etc. is providing value to an Incident Response team that would need to perform a security investigation. Current systems lack a standardized way of measuring the value of a log source. Vendor and/or in-house software logs may be cryptic in nature or not be configured to log data important to an investigation.

These and other drawbacks exist.

SUMMARY OF THE INVENTION

According to one embodiment, the invention relates to a system that implements a log source evaluation tool. The system comprises: a memory that stores log data; an user interface that receives user input via a communication network; and a computer processor, coupled to the user interface and memory, configured to perform the steps of: identifying a plurality of log sources in a network; receiving log data from each of the plurality of log sources; for each log source, generating a log quality index value, wherein the log quality index value comprises a device criticality value and a usefulness value; the device criticality value representing a measure of device criticality of the log in determining a security incident and the usefulness value representing a measure of usefulness based on individual event characteristics; and storing the log quality value index in the memory.

According to another embodiment, the invention relates to a method that implements a log source evaluation tool. The method comprises the steps of: identifying a plurality of log sources in a network; receiving log data from each of the plurality of log sources; for each log source, generating a log quality index value, wherein the log quality index value comprises a device criticality value and a usefulness value; the device criticality value representing a measure of device criticality of the log in determining a security incident and the usefulness value representing a measure of usefulness based on individual event characteristics; and storing the log quality value index in a memory.

The system may include a specially programmed computer system comprising one or more computer processors, interactive interfaces, electronic storage devices, and networks.

The computer implemented system, method and medium described herein provide unique advantages to entities, organizations and other users, according to various embodiments of the invention. Once security engineers have deployed a SIEM system, an IR team may utilize a Log Source Value Tool to investigate anomalous and malicious activity on the network. Without logs that contain meaningful data, the SIEM is ineffective in aiding the security analyst to make decisions with confidence. Instead, the analyst is forced to make decisions on incomplete data that can cost the business time and resources as well as cause analysts to miss actual security events. While competent team members may fill both engineering and incident response roles, the difficulty in clarifying the technical requirements is often a leading cause of failed SIEM implementations. An embodiment of the present invention is directed to quantifying the value of an individual log source sent to the SIEM to enable security analysts to move from intuitive, subjective assessments of logs towards one which quantitatively measures the log quality. This provides a useful communication tool between security engineers and security analysts in determining which logs should be captured, relied upon and then maintained for incident response and feedback. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE PREFERRED EMBODIMENT(S)

Figure 1:
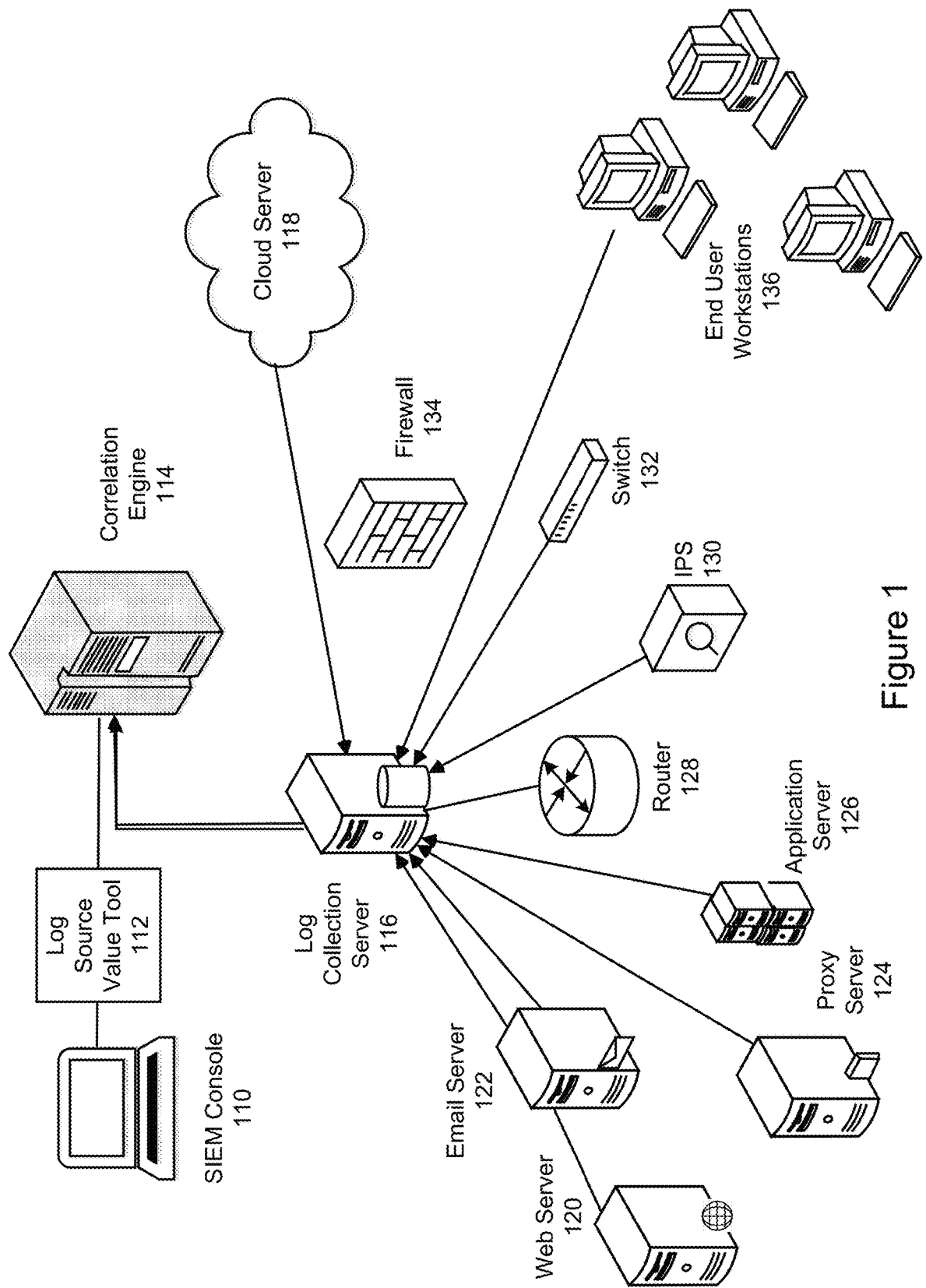
FIG. 1 illustrates a system implementing a Log Source Value Tool in a security information event management system, according to an embodiment of the present invention.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

The Security Information and Event Management (SIEM) system concept was introduced to the market, yet the SIEM system remains largely unrealized for many organizations. Measuring the operational effectiveness of the SIEM continues to be a challenge due to the complexity of deployment, configuration of the numerous components, and the process of determining the logs the Incident Response team needs to perform a comprehensive security investigation. While security engineers may be able to deploy the necessary components, they often lack the understanding of which logs provide valuable insight to answer the questions necessary to identify, contain, and eradicate malicious activity. Meanwhile, vendor recommendations often suggest sending all logs to the SIEM while simultaneously charging based on log ingestion rate. This creates a situation where vendors propose solutions to increase their bottom line budget versus the best interest of the customer.

An embodiment of the present invention is directed to quantifying the value of an individual log source sent to the SIEM. Through vendor-agnostic measurement, an algorithmic model utilized by a Log Quality Value (LQV) index enables security engineers and incident response (IR) teams to determine which logs provide the most value for security investigations. An embodiment of the present invention identifies a correlation between the LQV index and critical logs used to investigate the attack. An embodiment of the present invention may be extended to evaluate the LQV algorithms against a more extensive dataset from live production environments and to further measure the tool effectiveness through periodically comparing the LQV index to logs used to detect security incidents.

An embodiment of the present invention is directed to utilizing a Log Source Value Tool to quantitatively measure a log source's value to a recipient, such as a IR team. By utilizing this tool to measure the log source at multiple points in time, an embodiment of the present invention provides a comprehensive understanding of the value of a log source to an Incident Response team as well as how much value the SIEM is adding to that log source. According to an exemplary embodiment, the Log Source Value Tool may measure a Log Source at three points, including (1) a default configuration of log; (2) configuration after proper auditing and/or enabling of logging has been configured and (3) log source after ingestion into the SIEM has been implemented and data enrichment has been enabled.

An embodiment of the present invention may be extended to baseline the default, out-of-the box, log configurations for a set of software or operating system (OS) products and measure the log value there. An embodiment of the present invention may determine which events may be enabled to support improved Incident Response investigations. An embodiment of the present invention may measure how the STEM provides data enrichment to a log source. The innovative system and method may be extended to quantitatively evaluate the log and provide assurance and confidence to the team that needs to respond to security events.

FIG. 1 illustrates a system implementing a Log Source Value Tool in a security information event management environment, according to an embodiment of the present invention. FIG. 1 illustrates a SIEM Console 110. The SIEM Console 110 may execute Log Source Value Tool 112, which may be integrated with or separate from SIEM Console 110. For example, SIEM Console 110 may execute Log Source Value Tool 112 via an application or other program executable. According to another example, SIEM Console 110 may communicate with a separate Log Source Value Tool 112 via a communication network. Log data may be collected at Log Collection Server 116 from various sources and components, represented by Web Server 120, Email Server 122, Proxy Server 124, Application Server 126, Router 128, in-plane switching (IPS) 130, Switch 132 and End User Workstations 136. Other sources may include Cloud Server 118. The components may communicate through a firewall, represented by 134. The components illustrated in FIG. 1 are merely exemplary, other devices may be represented in various applications. While a single component is illustrated, each component may represent multiple components. The various embodiments of the present invention refer to a SIEM system for exemplary purposes. However, other security information management systems may be used.

As shown in FIG. 1, the devices represent components found within a SIEM deployment. Ingesting logs into the SIEM may vary depending on the complexity of the infrastructure environment. For example, the devices on the network may send logs to a centralized log collection server, represented by 116, in real time or at scheduled time intervals. Other components of SIEM architecture may support pulling logs from specified directories on the network, enriching data from external cloud-based feeds, direct database connectors, and Application Programming Interfaces (APIs) that query other systems to pull in data. For example, there may be hundreds of different types of devices on a single network, each with a separate log source.

Correlation Engine 114 may perform computational processing in the SIEM environment. Once deployed, these devices may transmit log data from around the network to a centralized location. An incident responder may view alerts that indicate potentially malicious activity on a SIEM console and launch an investigation if needed.

As noted above, SIEM technology relies upon logs generated from various sources on the network. The SIEM may serve as a single portal for the IR team to be alerted to aggregated and correlated events that have been processed through Correlation Engine 114. For teams to make high-confidence decisions, an embodiment of the present invention provides the ability to review critical security logs that address the 4Ws (e.g., Who, What, When, Where) and eventually "How" a security incident might have occurred.

The quality of the log source may be determined by the security analysts who make up the IR team. Quality may be understood as an ability of the security analyst to make a high-confidence decision based on the data contained within the log. An embodiment of the present invention is directed to enabling security analysts to move from intuitive, subjective assessments of logs towards one which quantitatively measures the log quality. This measurement may be a useful communication tool between security engineers and security analysts in determining which logs should be captured, relied upon and then maintained for incident response and feedback.

Figure 2:
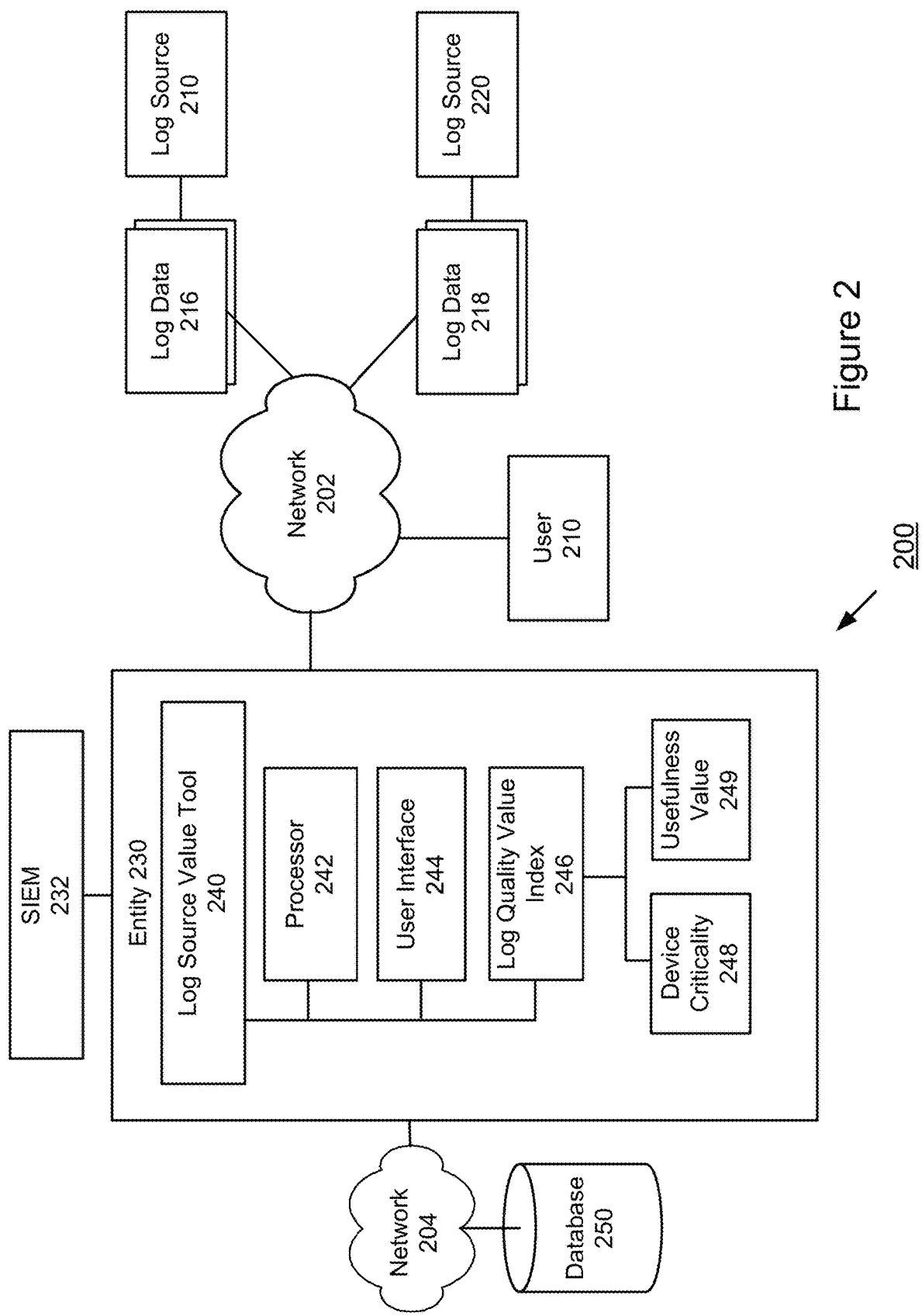
FIG. 2 illustrates an exemplary Log Source Value Tool, according to an embodiment of the present invention.

FIG. 2 illustrates an exemplary Log Source Value Tool, according to an embodiment of the present invention. Entity 230, such as a financial institution, may host a Log Source Value Tool 240. Entity 230 may support Log Source Value Tool 240 as an integrated feature or system. According to another example, Log Source Value Tool 240 may be offered by a third party service provider. Other scenarios may be implemented.

The Log Source Value Tool 240 described herein may be provided by Entity 230 and/or a third party provider or hosted in a SIEM environment, represented by 232. Log data, reports and analytics may be stored and managed in storage components, represented by Database 250. via Network 204.

According to an exemplary application, Log Source Value Tool 240 may include various processing components, modules and functions. The Log Source Value Tool of an embodiment of the present invention is directed to generating a usable artifact that assigns a numerical value to inherently subjective data. According to an exemplary implementation, Log Source Value Tool 240 may include Processor 242, User Interface 244 and Log Quality Value Index 246 which includes Device Criticality 248 and Usefulness Value 249. Other functions may be supported.

Network 202 may be communicatively coupled with various components in a network. Log Data 216, 218 associated with Log Source 210, 220, respectively, may be communicated via Network 202. User 210 may represent various types of users, including an IR team member, Security Engineer, Asset Owner, Application Owner and/or other users of the Log Source Value Tool 240. User 210 may communicate with the Log Source Value Tool 240 via Network 202 through User Interface 244. For example, a user may view log data and log source details and trends, manage and view alerts as well as access measurement and enrichment details via User Interface 244. An embodiment of the present invention may be directed to identifying trends across multiple entities and/or organizations. For example, the Log Source Value Tool may evaluate log data against multiple organizations within different industries to identify trends in the usefulness of specific log sources in relation to other logs used by those within an industry.

Log Source Value Tool 240 may send and/or receive data from various other sources, internal and/or external to Entity 230. Entity 230 may communicate with various users, represented by 210, using any mobile or computing device, such as a laptop computer, a personal digital assistant, a smartphone, a smartwatch, smart glasses, other wearables or other computing devices capable of sending or receiving network signals.

Log Quality Value Index 246 represents an index for each log based on at least two variables. A first variable (Cx) represents a measure of device criticality of the log in determining a security incident or data breach. A second variable (Vx) represents a granular measure of usefulness of individual event characteristics within the log to an Incident Responder. For instance, the second variable may relate to how the log source addresses the 4Ws (e.g., Who, What, When, Where). Other considerations may include whether the log contains unique data fields that are not found in other log sources within the environment. Together, the pair of variables provides a more precise value of the log being sent to the SIEM within the organization. This may be expressed as follows:

Log Quality Value=Criticality$_x$,Value$_x$

Or

LQV=$C_x V_x$

Device Criticality 248 may represent a criticality value ($C_x$) used to determine the importance or priority of the log in relationship to the other logs that exist in the environment. This value may be calculated through a set of measurements that describe the application or device generating the data in the log source. According to an exemplary application, the Criticality value may fall into four representative types, namely Criticality I, II, III IV, described below. Other variations and types may be implemented.

An application or device log classified as Type I may contain some of all of the following: (a) PII or sensitive data to which unauthorized exposure would result in financial loss, loss of life, or regulatory fines. (b) Events that are a Primary Source of key data for the Incident Response team. For example, loss of the log source may result in an inability to correlate and/or identify potentially malicious activity in the environment. Examples may include logs that contained who performed the action, what action occurred, when the action occurred, and where on the network it occurred.

An application or device log classified as Type II may contain contextual data that enriches Primary Source Data Events. Examples may include Threat Intelligence Data or Asset Inventory Information Management System.

For Type III, an application or device log may include events also contained in other log sources (e.g., Secondary Sources) to which the loss of such data would not result in the inability to correlate, detect, identify or prevent an investigation. Multiple log sources that contain redundant data decrease the Criticality of the log within the environment and in some instances should be considered for removal from the SIEM.

An application or device log that is categorized as Type IV does not contain events that store or transmit PII/sensitive data. The logs do not contain events that have been used to confirm malicious activity in the past. Debug logs that provide no security value may be placed here. Logs that are required to be retained for regulatory or policy reasons will typically fall under this classification.

After an organization has inventoried logs using the LQV index, a visualization method of an embodiment of the present invention may provide understanding of the number of critical logs with relationship to each other. If the majority of the log sources fall into Type IV, this indicates that the SIEM has many logs that are not providing useful information to an incident responder.

Usefulness Value 249 may apply a Value ($V_x$) algorithm calculated by assigning an initial value of zero to $V_x$ (e.g., $V_x$=0), performing a series of instructions, and returning the final output back to V.

According to an embodiment of the present invention, V, may be expressed as the following summation:

$$V_x = \sum_{n=1}^{29} \lambda_n(W_n)$$

where this expands to:

$V_x = \lambda_1(W_1) + \lambda_2(W_2) + \ldots \lambda_n(W_n)$

This exemplary summation considers 29 separate characteristics to evaluate the log sources against. The summation is merely exemplary and may be modified to include a varying number of characteristics, e.g., hundreds of characteristics. In addition, these characteristics may also depend on the type of device (e.g., Firewall, Anti-Virus, File Integrity Monitoring system, etc.) that is being evaluated. For example, an embodiment of the present invention may use a set of characteristics (e.g., 29 characteristics) to evaluate a firewall log source and another set of characteristics (e.g., 40 characteristics) to evaluate an Anti-Virus log. Accordingly, the system may use a differing number of characteristics based on the type of device as well as other factors and considerations.

In this example, lambda, k, represents a function taking the variable $W_n$, a weighted value, as input, and returning an output. According to an embodiment of the present invention, a measurement may determine the next instructions performed by the function. A measurement or determination may perform an operator against a current value contained in V. For example, if a hypothetical log contains a Source IP Address and a Weighted Value for that determination is +3, then the instruction is to add 3 to the current value contained within $V_x$, as illustrated below:

$$V_x = V_x + \text{Weighted Value}$$

$$V_x = 0 + (+3)$$

$$V_x = 3$$

If a subsequent determination had a Weighted Value equal to −2, then the instruction is to subtract 2 from $V_x=3$ and $V_x$ would now equal 1. The Usefulness Value Calculator may perform that operator (e.g., subtraction) against the current value contained within V. The following calculations may be performed:

$$V_x = V_x + \text{Weighted Value}$$

$$V_x = 3 + (-2)$$

$$V_x = 1$$

The Value ($V_x$) may be determined by data fields contained within the log. A set of measurements and/or determinations may be applied to identify characteristics of a log source that would make it valuable or less valuable to an Incident Response team. According to an exemplary application, the determination and corresponding weights may include:

(a) Does the log source contain WHERE (e.g., Source IP Address) the event occurred: Weighted Value=+3;

(b) Does the log source contain WHO or WHAT performed the action (e.g., Username, Hostname): Weighted Value=+2;

(c) Does the log source contain the ACTION that occurred? (e.g., Log On, Sign On, Virus Quarantined): Weighted Value=+3;

(d) Does the log source contain data that is difficult to parse and/or correlate with other events: Weighted Value=−2.

Other determinations and/or corresponding weighted values may be applied. An embodiment of the present invention recognizes that security controls that detect attack vectors should have a higher Log Quality Value if the sources have been configured to log the optimal information. Accordingly, resulting values should mainly reside in the Criticality Type I ($C_1$) quadrant, and represent a relatively higher value $V_x$ in the SIEM environment. A low $V_x$ score (e.g., $V_x<10$) may indicate that the value of the log has room for improvement.

The Log Quality Value index effectively determines whether the tools that were deployed in the simulated environment contained logs of value to the Incident Response team during the investigation phase. According to an exemplary embodiment, each of these log samples would be located in the $C_1$ quadrant and have a value towards the upper range of $V_x$ scores within the environment. For example, a $V_x>20$ may indicate a higher value to the organization than a $V_x<10$. Log sources that demonstrate a higher LQV index may correspond with the tools used to detect the attack. For example, a lower LQV index (e.g., $C_3$ or $C_4$ and $V_x<10$) may be an indicator to the organization that additional tuning or configuration should be applied to the detection devices or if further enhancements could not be made, then alternative vendor solutions should be considered by the organization.

An embodiment of the present invention recognizes that if not configured properly, otherwise forensically rich material might not be valuable to send to the SIEM to alert due to being hard to interpret by the SIEM. For example, while File Integrity Monitoring may contain valuable sources of information after an attack has occurred, the formats of the logs may be difficult to interpret or parse making this a problematic data source to correlate information. In this example, the File Integrity Monitoring tool produced logs in JSON format make specific events hard to parse which would make a correlation with other events more difficult within the SIEM. Accordingly, logs that are difficult to parse is one criterion that may drive down the overall value ($V_x$) of the log to the Incident Response team. In addition, an embodiment of the present invention may recognize that a source, e.g., Vulnerability Scanner, used within the simulated environment generates a report that would not be easily parsed and fed into a SIEM for alerting purposes. Based on the LQV index, the logs generated would deliver minimal benefit to the security analyst. Sources with a Criticality Type II may indicate that they primarily capture information that is contextual but would not be key sources used by an analyst during an investigation.

Accordingly, an ability to parse and view logging information outside of the tool generating the log may be considered an important criterion used in the LQV algorithm. A key goal of the Log Quality Value tool may be directed to determining which logs contain content of value to the Incident Response for use within a STEM.

An embodiment of the present invention is directed to applying more complex calculations for various other applications and scenarios. This may involve considering previous user responses as a multiplier against the $V_x$ or perform other averages on the value of $V_x$ that may result in more precise calculations of the V. This provides for more distinction between minimum and maximum LQVs enhancing the ability to determine valuable logs.

According to an embodiment of the present invention, the Log Source Value Tool ensures high-quality logs are fed into the SIEM and retroactively used at organizations to assess the LQV of logs that are currently in place.

The system 200 of FIG. 2 may be implemented in a variety of ways. Architecture within system 200 may be implemented as hardware components (e.g., module) within one or more network elements. It should also be appreciated that architecture within system 200 may be implemented in computer executable software (e.g., on a tangible, non-transitory computer-readable medium) located within one or more network elements. Module functionality of architecture within system 200 may be located on a single device or distributed across a plurality of devices including one or more centralized servers and one or more mobile units or end user devices. The architecture depicted in system 200 is meant to be exemplary and non-limiting. For example, while connections and relationships between the elements of system 200 are depicted, it should be appreciated that other connections and relationships are possible. The system 200 described below may be used to implement the various methods herein, by way of example. Various elements of the system 200 may be referenced in explaining the exemplary methods described herein. An exemplary embodiment may be directed to a cloud-based system where Best Possible Values are maintained in a catalog of "Recommended Log Configuration Values" for a specific product line (or type of product). For example, an organization may identify a specific software product they wish to send to the SIEM. The SIEM may reference a "Best Possible Value" for a specific product (or type of product) stored on a cloud-based system managed by the vendor or other entity. This may be used to automate the configuration of the log source to improve the Log Quality Value (LQV) prior to being sent to the SIEM.

Network 202, 204 may be a wireless network, a wired network or any combination of wireless network and wired network. For example, Network 202, 204 may include one or more of an Internet network, a satellite network, a wide area network ("WAN"), a local area network ("LAN"), an ad hoc network, a Global System for Mobile Communication ("GSM"), a Personal Communication Service ("PCS"), a Personal Area Network ("PAN"), D-AMPS, Wi-Fi, Fixed Wireless Data, or any other wired or wireless network for transmitting or receiving a data signal. Also, Network 202, 204 may support an Internet network, a wireless communication network, a cellular network, Bluetooth, or the like, or any combination thereof. Network 202, 204 may further include one, or any number of the exemplary types of networks operating as a stand-alone network or in cooperation with each other. Network 202, 204 may utilize one or more protocols of one or more network elements to which it is communicatively coupled. Network 202, 204 may translate to or from other protocols to one or more protocols of network devices. Although Network 202, 204 is depicted as one network for simplicity, it should be appreciated that according to one or more embodiments, Network 202, 204 may comprise a plurality of interconnected networks, such as, for example, a service provider network, the Internet, a cellular network, corporate networks, or even home networks, or any of the types of networks mentioned above. Data may be transmitted and received via Network 202, 204 utilizing a standard networking protocol or a standard telecommunications protocol.

Entity 230 may be communicatively coupled to Databases, represented by 250. Databases 250 may include any suitable data structure to maintain the information and allow access and retrieval of the information. The storage may be local, remote, or a combination thereof with respect to Databases 250. Communications with Databases 250 may be over a network, or communications may involve a direct connection between Databases 250 and Entity 230, as depicted in FIG. 2. Databases 250 may also represent cloud or other network based storage.

Figure 3:
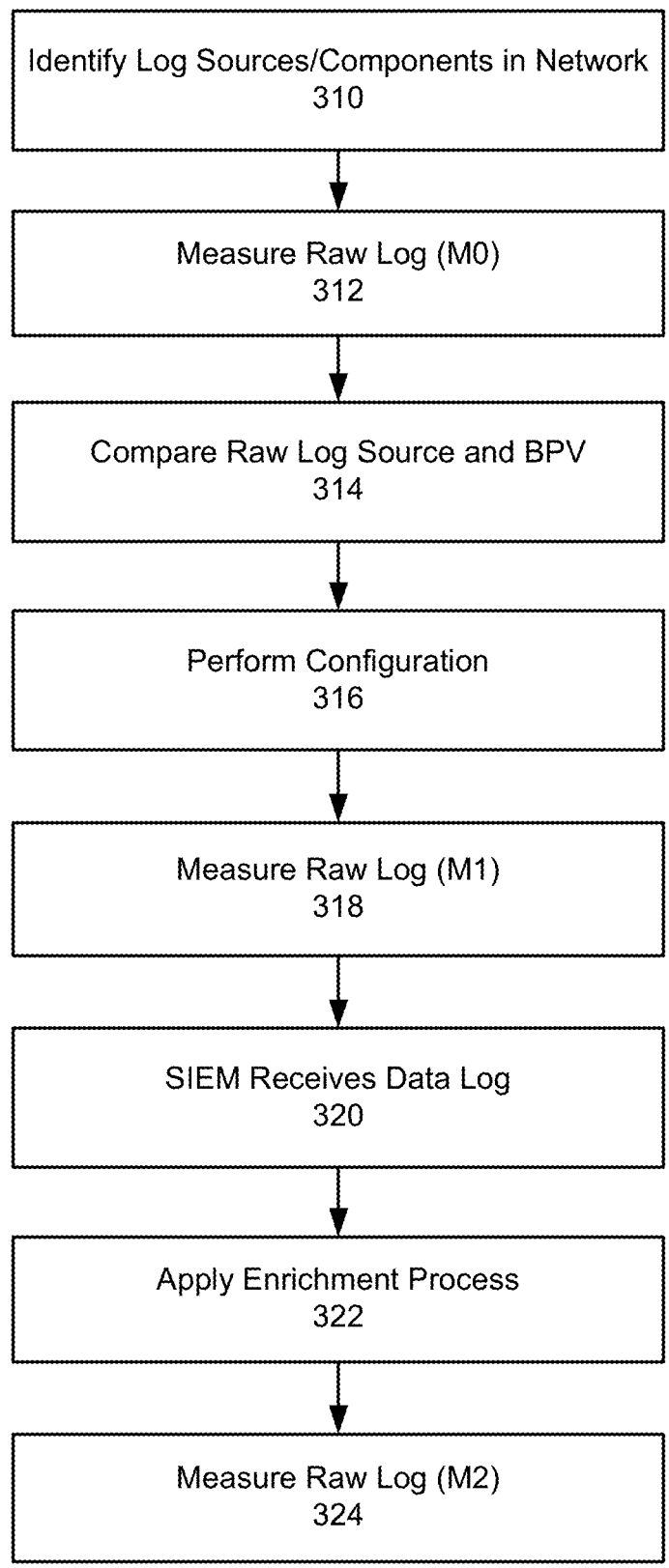
FIG. 3 illustrates an exemplary flow chart of a log quality value process, according to an embodiment of the present invention.

FIG. 3 illustrates an exemplary flow chart of a log quality value process, according to an embodiment of the present invention. At step 310, log sources and/or components in a network may be identified. At step 312, a first measurement M0 may be taken of the raw log data. For example, the SIEM would capture a raw log from device/application on the network. This would effectively be M0 or Measurement at Initial ingestion. At step 314, the raw log source may be compared to a Best Possible Value (BPV). A comparison between the raw log source and the Best Possible Value managed by the SIEM vendor for that log source. At step 316, configuration may be performed. At step 318, a second measurement M1 may be taken. The SIEM may make suggestions and/or modifications to the raw log source that may require logging configuration and/or modifications to the device and/or application log. After the changes are made to the raw log source, another measurement would be taken by the SIEM and this would be M1. At step 320, SIEM may receive data log from the log sources. At step 322, data enrichment may be applied. At step 324, a third measurement, M2 may be taken. After ingestion of the log by the SIEM, and going through the SIEM data enrichment process, a final M3 measurement would take place. While the process of FIG. 3 illustrates certain steps performed in a particular order, it should be understood that the embodiments of the present invention may be practiced by adding one or more steps to the processes, omitting steps within the processes and/or altering the order in which one or more steps are performed.

An embodiment of the present invention may be directed to implementing a 3-point vendor-agnostic measurement strategy. For example, if the $M_1$, or $\beta$, represents the highest security value the log source could be configured to log, Incident Responders may evaluate the logs after deployment, determine the delta from the best logging configurations published in the guide, and communicate to Asset Owners which logging configurations need to be implemented in order to provide greater value to the Incident Response team, Security Operations Center (SOC), for example. The Security Operations Center (SOC) may generally represent a team of individuals that protect the organization from cyber threats, attacks and/or other malicious intents that may damage the confidentiality, integrity, and/or availability of a system. The SOC team may include separate groups such as Incident Responders, Security Engineers, Vulnerability Management, and/or other security professionals to protect the organization.

An embodiment of the present invention is directed to enriching raw log data to provide better context for security events which enables faster analysis. An embodiment of the present invention may apply a three-point measurement (M) approach: where $M_0$ represents an initial LQV at raw log data source, default log configuration after installation of product; $M_1$ represents LQV measurement after maximum log configuration where maximum may be defined as log configurations that contain data field attributes that enable security investigations; and $M_2$ represents LQV measurement within the SIEM with data enrichment configured (e.g., Outbound DNS logs paired with Threat Intelligence Blacklist).

For example, $M_0$ and $M_1$ may be evaluated per vendor software/hardware product creating a Minimum LQV, or $\alpha$, and Maximum LQV or $\beta$. The $M_2$, or $\varsigma$, measurement may be evaluated after SIEM deployment and data enrichment log sources have been ingested by the SIEM. With [$\alpha$, $\beta$] calculated independent of the vendor with the $\varsigma$ calculated after ingestion to the SIEM, then the $\Delta LQV = \varsigma - \beta$ would equal the value of the data enrichment the SIEM is providing to the IR team.

Figure 4:
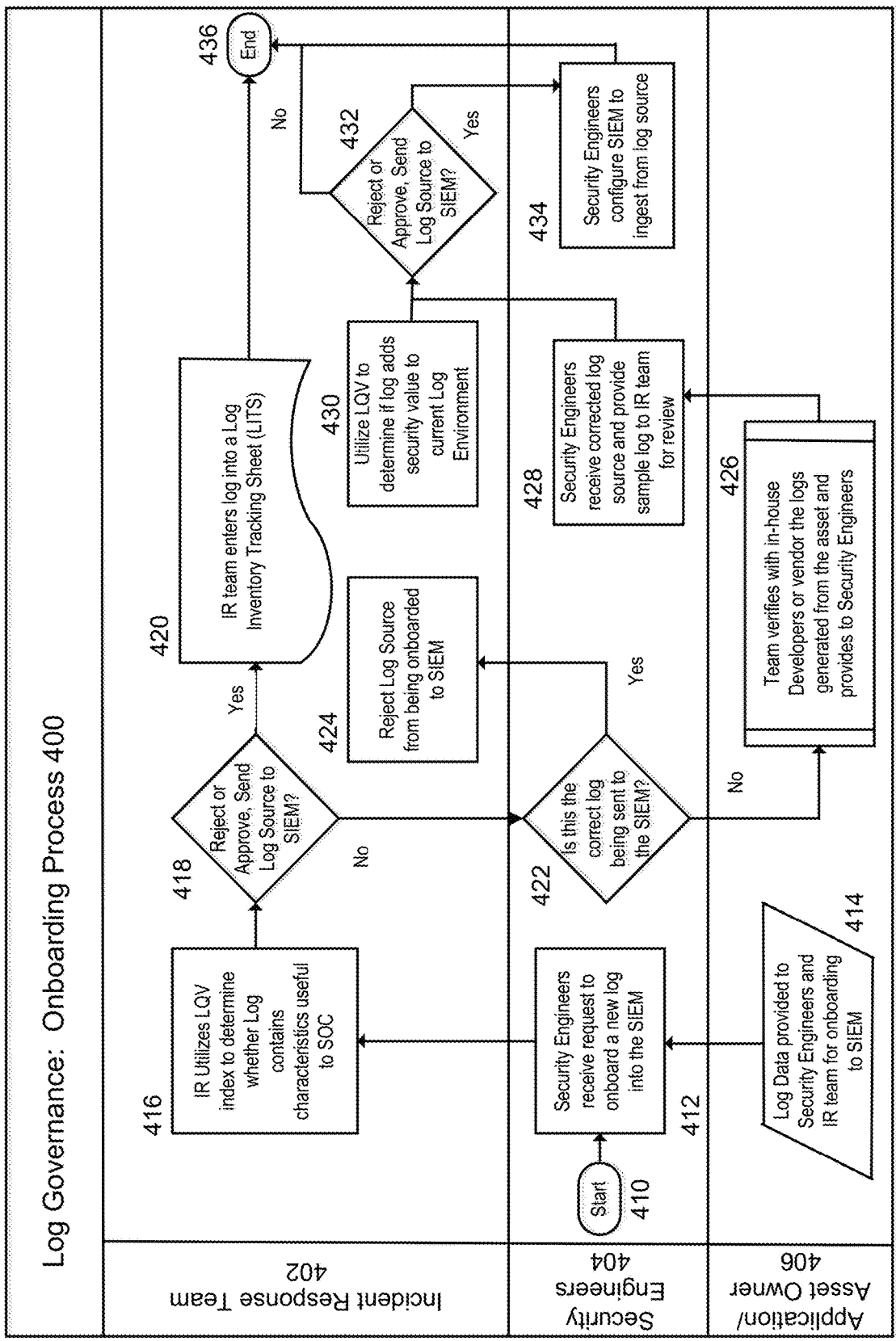
FIG. 4 illustrates an exemplary flow chart of an onboarding process, according to an embodiment of the present invention.

FIG. 4 illustrates an exemplary flow chart of an onboarding process, according to an embodiment of the present invention. FIG. 4 illustrates an exemplary log governance onboarding process 400. FIG. 4 depicts interaction between Incident Response Team 402, Security Engineers 404 and Application/Asset Owner 406. As shown in FIG. 4, an exemplary onboarding process may start at 410. At 412, security engineers receives request to onboard a new log into the SIEM. As shown by 414, log data may be provided to Security Engineers and IR teams. At 416, IR team may utilize a LQV index to determine whether the log contains characteristics that may be useful to the SOC. At step 418, the system may reject or approve the log and send the log source to SIEM. Depending on the resulting LQV, a decision may be made to send the Log Source to the SIEM. If yes (approved), IR team may enter the log into a log inventory tracking sheet (LITS) that captures LQV index, brief description of the log source and further document key event fields at 420. The process may then end at 436. If no (rejected), the system may determine if the correct log was sent to the SIEM at 422. If yes, IR team may reject the log source from being onboarded to SIEM. IR team may then document within LITS a reason for the rejection. If no, the team verify with developers or vendor the log generated from the asset and provide to the security engineers, at 426. At 428, Security Engineers may receive the corrected log source and provide a sample log to the IR team to review. At step 430, IR team may utilize the LQV to determine if the log adds security value to a current log environment. At step 432, the system may reject or approve the log and send the log source to SIEM. If no (rejected), the process may end at 436. If yes (approved), security engineers may configure IEM to ingest from log source at step 434. The order illustrated in FIG. 4 is merely exemplary. While the process of FIG. 4 illustrates certain steps performed in a particular order, it should be understood that the embodiments of the present invention may be practiced by adding one or more steps to the processes, omitting steps within the processes and/or altering the order in which one or more steps are performed.

Figure 5:
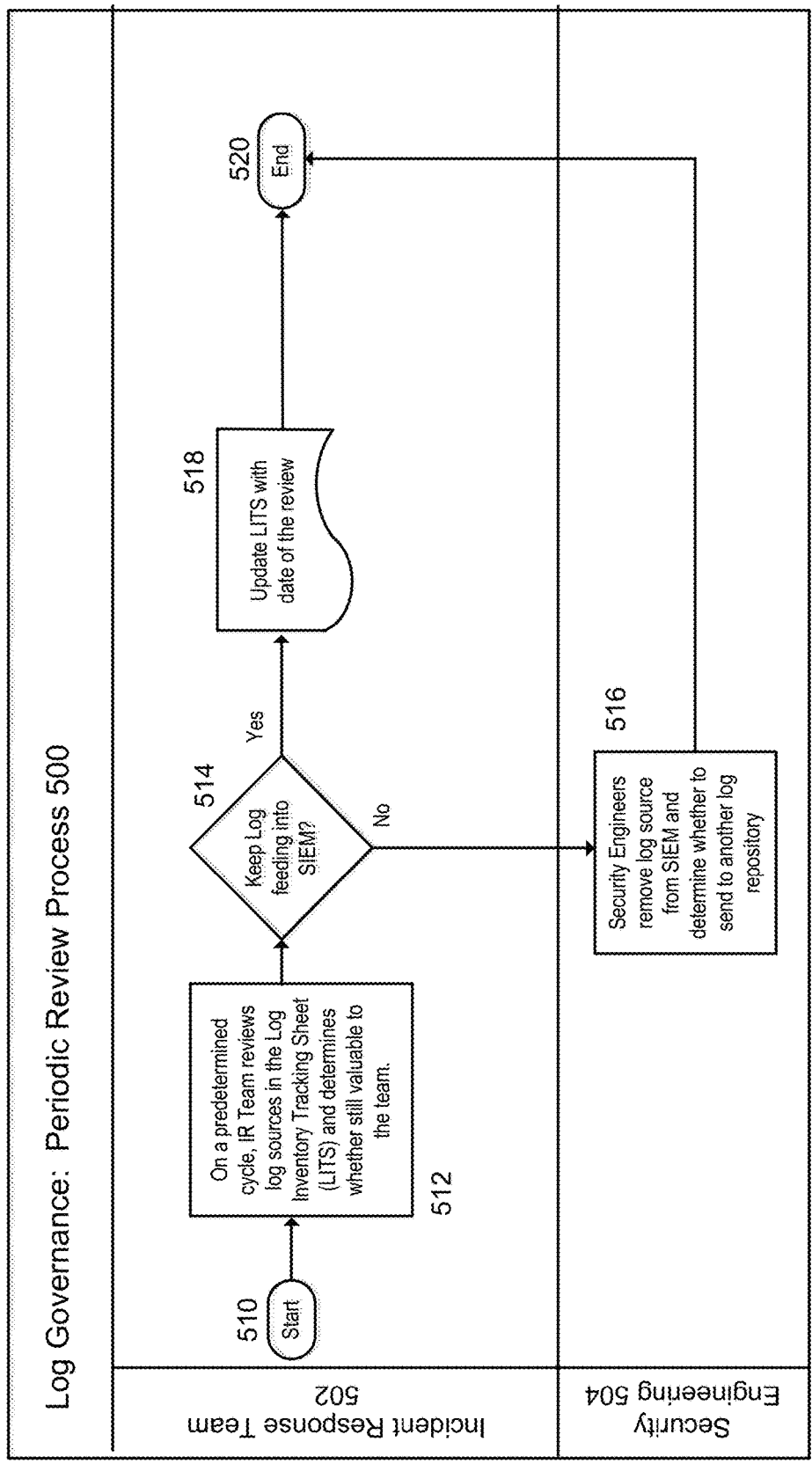
FIG. 5 illustrates an exemplary flow chart of a log periodic review process, according to an embodiment of the present invention.

FIG. 5 illustrates an exemplary flow chart of a log periodic review process, according to an embodiment of the present invention. FIG. 5 illustrates an exemplary log governance periodic review process 500. FIG. 5 depicts interaction between Incident Response Team 502 and Security Engineering 504. As shown in FIG. 5, an exemplary onboarding process may start at 510. At step 512, the IR team may review the log sources in a Log Inventory Tracking Sheet (LITS) and determine whether it is valuable to the team. This may occur at predetermined intervals, e.g., biannual, annual, etc. At step 514, the system may determine whether to keep the log feeding into SIEM. If yes, the system may update the LITS with the date of the review and other details, at step 518, If not, security engineers may remove the log source from SIEM and determine whether to send to another log repository at 516. The process may end at 520. The order illustrated in FIG. 5 is merely exemplary. While the process of FIG. 5 illustrates certain steps performed in a particular order, it should be understood that the embodiments of the present invention may be practiced by adding one or more steps to the processes, omitting steps within the processes and/or altering the order in which one or more steps are performed.

The various embodiments of the present invention may be further extended to provide a wide range of features and functionality. An embodiment of the present invention may provide automated credentials injection in the service instances. The framework may inject transparently in the application runtime the credentials required to consume the service instance. The credentials may be accessed on the fly from a vault, e.g., an enterprise secret vault, in a transparent, secured manner. In this example, users do not manipulate secrets. The entitlements may be stored and consume where they are required, as in the application run time.

An embodiment of the present invention may provide advanced service scoping. According to an embodiment of the present invention, a service marketplace catalog may show services and/or plans meeting specific conditions. Conditions may include whether they are from a specific department, line of business, organization, etc. The service/plan may be available in a specific region, datacenter and/or other geographic location. The platform running the marketplace may be of a specific type and/or of a specific version. Service providers may fine tune their offering to meet the complex need of each consumer in their specific context (e.g., organization, datacenter, cloud service preference, etc.). For example, a more secured and expensive version of a service may automatically replace a standard version of a service for customers from a team that manipulates sensitive data, e.g., credit card information.

An embodiment of the present invention may provide improved observability, e.g., view of service health. An embodiment of the present invention may mandate service brokers and service instances to expose health and operational metrics endpoints. The marketplace may include each service/plans as well as their health across their deployments globally and/or within a certain location. For example, a user may challenge a decision to provision a service showing a history of health issues and further understand from the beginning why an application is not behaving as expected. An embodiment of the present invention may detect underlying services having issues. For example, improved observability provides a standardized way for a service provider to explore the health of their services.

An embodiment of the present invention may facilitate onboarding services through Service Provider Self Service Onboarding. For example, a Service Provider may onboard seamlessly and automatically a sandbox platform marketplace to test if the service and/or aspects of the service works as expected. Once satisfied, the Service Provider may request the framework owner to promote the service to a higher environment. An embodiment of the present invention achieves high velocity to onboard new service.

An embodiment of the present invention is directed to providing a Service Catalog and delivering service framework to new platforms. This expands the services that may be available on more platforms.

An embodiment of the present invention may provide improvements in billing through subscription usage model for services. For example, an embodiment of the present invention may provide an automated billing of service instances per hour or other time increment. Services Providers may specify more advanced billing model and specific, including number of GB used, network traffic, etc. This feature provides a capacity to set throttling, e.g., downsize a service instance if a predefined limit has been exceeded (or other threshold). An embodiment of the present invention seeks to facilitate and simplify the billing process that a service provider offers to customers thereby enabling a myriad of new commercial opportunities and business cases. For example, a service provider may offer a service and further specify a charge for the service.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, JavaScript and/or Python. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system that implements a log source evaluation tool for a security incident, the system comprising:
   a memory that stores log data;
   an user interface that receives user input via a communication network; and
   a computer processor, coupled to the user interface and memory, configured to perform the steps of:
   identifying a plurality of log sources from a plurality of devices in a network;
   receiving log data from each of the plurality of log sources;
   quantitatively measuring the value of each log source to a security incident response team by generating a log quality index value based on at least two variables comprising:

a first variable representing a measure of device criticality of the log data for the given log source in resolving the security incident, on an absolute basis and in relation to each of the other log sources comprising the plurality of log sources, a value for the first variable being selected among a group comprising Type I, Type II, Type III and Type IV, wherein Type I is for logs that include one or more of personally identifiable information and one or more events that are a primary source of data for the security incident response team, Type II is for logs that include contextual data that enriches the Type I data, Type III is for logs that include redundant data, and Type IV is for logs that do not include information useful to the security incident response team;

a second variable representing a granular measure of usefulness of one or more individual event characteristics within the log data for the given log source to the security incident response team, wherein the second variable is determined by applying an initial value of zero, performing a series of instructions that address a plurality of discrete characteristics from the log data, and summing the values resulting from the instructions as applied to each of the plurality of discrete characteristics;

display, via the user interface, a visualization of the relative importance of each of the plurality of log sources to the security incident based on the log quality index value for each of the plurality of log sources; and storing the log quality value index in the memory.

2. The system of claim 1, wherein the measure of criticality comprises a plurality of criticality types.

3. The system of claim 1, wherein a first criticality type represents sensitive data.

4. The system of claim 3, wherein a second criticality type represents contextual data that enriches primary source data events.

5. The system of claim 4, wherein a third criticality type represents event data contained in other log sources.

6. The system of claim 5, wherein a four criticality type represents data relevant to debug logs.

7. The system of claim 1, wherein the usefulness value represents data relevant to where an event occurred.

8. The system of claim 1, wherein the usefulness value represents data relevant to who or what performed an action.

9. The system of claim 1, wherein the usefulness value represents data relevant to an action that occurred.

10. The system of claim 1, wherein the log quality index value is generated for each log source at three points comprising: (1) a default configuration of data log for the log source; (2) after implementation of one or more logging configuration recommendations for the log source and (3) after data enrichment has been enabled.

11. A method that implements a log source evaluation tool for a security incident, the method comprising the steps of:
identifying a plurality of log sources from a plurality of devices in a network;
receiving log data from each of the plurality of log sources;
quantitatively measuring the value of each log source to a security incident response team by generating a log quality index value based on at least two variables comprising:

a first variable representing a measure of device criticality of the log data for the given log source in resolving the security incident, on an absolute basis and in relation to each of the other log sources comprising the plurality of log sources, a value for the first variable being selected among a group comprising Type I, Type II, Type III and Type IV, wherein Type I is for logs that include one or more of personally identifiable information and one or more events that are a primary source of data for the security incident response team, Type II is for logs that include contextual data that enriches the Type I data, Type III is for logs that include redundant data, and Type IV is for logs that do not include information useful to the security incident response team;

a second variable representing a granular measure of usefulness of one or more individual event characteristics within the log data for the given log source to the security incident response team, wherein the second variable is determined by applying an initial value of zero, performing a series of instructions that address a plurality of discrete characteristics from the log data, and summing the values resulting from the instructions as applied to each of the plurality of discrete characteristics;

display, via the user interface, a visualization of the relative importance of each of the plurality of log sources to the security incident based on the log quality index value for each of the plurality of log sources; and storing the log quality value index in a memory.

12. The method of claim 11, wherein the measure of criticality comprises a plurality of criticality types.

13. The method of claim 11, wherein a first criticality type represents sensitive data.

14. The method of claim 13, wherein a second criticality type represents contextual data that enriches primary source data events.

15. The method of claim 14, wherein a third criticality type represents event data contained in other log sources.

16. The method of claim 15, wherein a four criticality type represents data relevant to debug logs.

17. The method of claim 11, wherein the usefulness value represents data relevant to where an event occurred.

18. The method of claim 11, wherein the usefulness value represents data relevant to who or what performed an action.

19. The method of claim 11, wherein the usefulness value represents data relevant to an action that occurred.

20. The method of claim 11, wherein the log quality index value is generated for each log source at three points comprising: (1) a default configuration of data log for the log source; (2) after implementation of one or more logging configuration recommendations for the log source and (3) after data enrichment has been enabled.

\* \* \* \* \*